(12) United States Patent        (10) Patent No.:     US 6,473,962 B1
Beduhn                           (45) Date of Patent:     Nov. 5, 2002

(54) ROTARY DIE CUTTER APPARATUS AND METHOD

(75) Inventor: Mark W. Beduhn, Menasha, WI (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 100 days.

(21) Appl. No.: 09/685,763

(22) Filed: Oct. 10, 2000

Related U.S. Application Data

(60) Continuation-in-part of application No. 09/440,170, filed on Nov. 15, 1999, now Pat. No. 6,343,420, which is a division of application No. 08/570,950, filed on Dec. 12, 1995, now Pat. No. 6,003,229.

(51) Int. Cl.[7] ............................. B23Q 15/00; B23P 19/06
(52) U.S. Cl. .................. 29/714; 29/724; 29/898.09; 29/704.02; 73/862.23; 173/181
(58) Field of Search ....................... 29/709, 714, 724, 29/898.07, 898.09, 407.02, 407.03, 407.05; 73/862.08, 862.23; 173/5, 6, 176, 181

(56) References Cited

U.S. PATENT DOCUMENTS

| | | | |
|---|---|---|---|
| 3,041,867 A | 7/1962 | Knudsen | 73/9 |
| 4,908,926 A | 3/1990 | Takeshima et al. | 29/407 |
| 5,115,558 A | 5/1992 | Bernhardt et al. | 29/705 |
| 5,125,156 A | 6/1992 | Witte | 29/898.09 |
| 5,502,883 A | 4/1996 | Ohmi et al. | 29/407.02 |
| 5,579,570 A | 12/1996 | Bonvallet | 29/724 |
| 5,722,163 A | 3/1998 | Grant et al. | 29/898.07 |
| 6,003,229 A | 12/1999 | Beduhn et al. | 29/898.09 |
| 6,343,420 B1 * | 2/2002 | Beduhn et al. | |

FOREIGN PATENT DOCUMENTS

JP           01-205942     *   8/1989

* cited by examiner

*Primary Examiner*—S. Thomas Hughes
*Assistant Examiner*—Eric Compton
(74) *Attorney, Agent, or Firm*—Thomas J. Connelly; Thomas M. Parker; Douglas G. Glantz

(57) ABSTRACT

Apparatus and method precisely preload bearings onto shafts. A swivel plate swivels up to 360° and locks a rotary shaft axially with a motor shaft. A shim and bearing adjacent the shim preload onto shaft shoulder by lock nut secured to the threaded shaft. The lock nut forces the bearing inner race to expand outwardly, preloading the bearing. A force sensor measures torque on the bearing outer race. Measured torque is monitored within a predetermined range to establish the precisely loaded bearing. The method slides a shim onto support shaft shoulder. A bearing is slid onto tapered surface, and lock nut tightened onto the threaded shaft. The lock nut expands the bearing inner race, reducing the distance between the inner and outer races and preloading the bearing. The outer race at a predetermined, constant speed has torque monitored to a predetermined range to provide a precisely preloaded bearing.

10 Claims, 3 Drawing Sheets

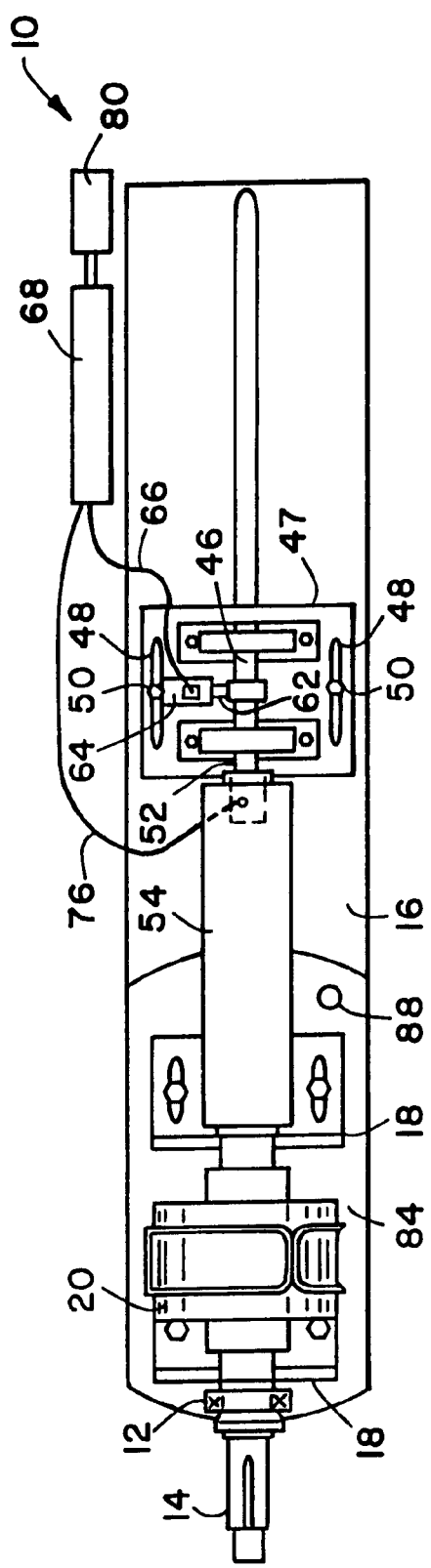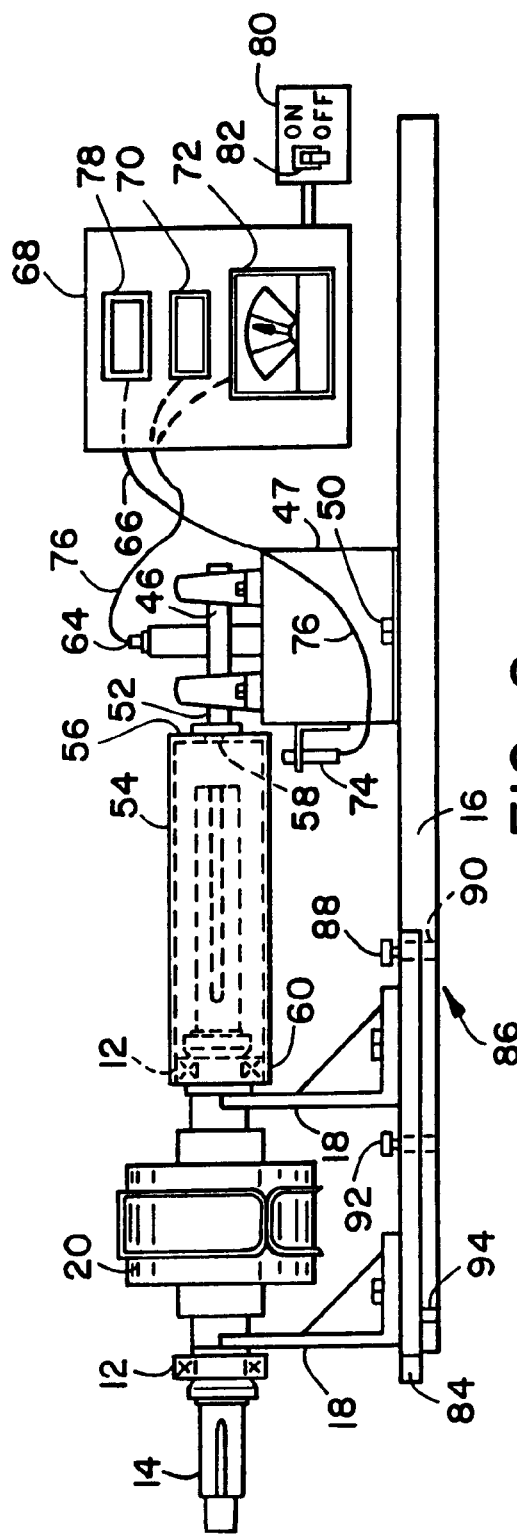

ROTARY DIE CUTTER APPARATUS AND METHOD

This is a continuation-in-part of prior, application Ser. No. 09/440,170 filed Nov. 15, 1999, now U.S. Pat. No. 6,343,420, which is a divisional of application Ser. No. 08/570,950 filed Dec. 12, 1995, now U.S. Pat. No. 6,003,229.

BACKGROUND OF THE INVENTION

1. Technical Field

This invention relates to an apparatus and method for precisely preloading a bearing onto a shaft. In one aspect, this invention relates to an apparatus and method for precisely preloading a spherical roller bearing onto a rotary die cutter shaft.

2. Background

Bearings are used in many different applications for supporting rotating equipment. Examples of bearings are ball bearings, needle bearings, tapered roller bearings, and spherical roller bearings.

Rotary die cutters cut many different kinds of materials. Examples of materials cut by rotary die cutters in large volumes are gaskets, labels, and stickers.

INTRODUCTION TO THE INVENTION

Spherical roller bearings contain an outer race, an inner race, and a plurality of freely rotatable spherical roller elements positioned between the two races. The inner race contains a tapered bore formed on the interior diameter of the inner race. The tapered bore mates with a taper machined into a shaft onto which the spherical roller bearing is to be mounted. Spherical roller bearings provide a high degree of runout precision for rotary die cutters. A pair of spherical roller bearings rotatably mount a rotary die cutter onto a shaft. The shaft mounted rotary die cutter then is assembled into a die cutting module.

When using spherical roller bearings, the bearings should be preloaded precisely to provide a precision mounting of the rotary die cutter and to extend the life of the bearing.

The tapered bore on the internal diameter of a spherical roller bearing should match up with a taper machined into the shaft onto which the bearing will be mounted. For operations using a rotary die cutter, a shaft will mount the rotary die cutter in a center position. The shaft will contain a pair of tapered surfaces, each located adjacent to one side of the rotary die cutter. A shoulder is machined into the shaft adjacent to each tapered surface. A thread is machined into the shaft adjacent to the tapered portions. A metal shim is slid onto the shaft and is positioned adjacent to the shoulder. The spherical roller bearings then are positioned onto the tapered surfaces. The thickness of each shim will dictate the distance an adjacent bearing will be able to move up the tapered surface. A lock nut then is threaded onto each end of the shaft. Each lock nut will contact the inner race of one of the bearings. As the inner race of each bearing expands, it causes the bearing to be preloaded onto the shaft. The lateral distance the bearing moves up the tapered surface then is determined by the thickness of the metal shim which has been slid onto The shaft.

If the bearing is not sufficiently preloaded, it will be sloppy, and the shaft to be supported will not revolve with the required precision. Conversely, if the bearing is excessively preloaded, it will fail prematurely requiring expensive downtime and replacement.

Different methods can be used to preload a bearing onto a shaft. One method uses a bearing gauge and gauge blocks to determine the proper shim thickness required to set the bearing preload. The bearing gauge and gauge blocks work on new bearings but cannot be used to preload reconditioned bearings because the size of the rolling elements will not be the same as those of new bearings. A second method involves the use of a string wrapped around the outer race of a bearing after it has been secured in place by the lock nut. The free end of the string is attached to a spring scale, similar to those used to weigh fish. As the string is pulled, the resistance of the roller elements of the bearing can be measured. This second method is subjective to human error and tends to be inaccurate, especially when performed by an inexperienced operator. Although the second method does work on both new and reconditioned bearings, it will not work when the bearings are packed with certain synthetic greases which do not have an extreme pressure additive.

Now, an apparatus and method have been developed for precisely preloading a new or reconditioned bearing onto a shaft. The apparatus and method also work on bearings which have been packed with certain synthetic greases not having an extreme pressure additive.

It is an object of the present invention to provide an apparatus and method for precisely preloading a bearing onto a shaft.

It is another object of the present invention to provide an apparatus and method for precisely preloading a spherical roller bearing onto a shaft.

Another object of the present invention is to provide an apparatus and method for precisely preloading a new or reconditioned bearing onto a shaft.

Still another object of the present invention is to provide an apparatus and method for precisely preloading a bearing onto a shaft even when the bearing has been packed with certain synthetic greases which do not have an extreme pressure additive. A further object of the present invention to provide an easy and reliable method for precisely preloading a spherical roller bearing onto a shaft.

Still further, an object of the present invention is to provide a relatively simple apparatus for precisely preloading a spherical roller bearing onto a shaft.

Still further, another object of the present invention is to provide a simple and straight forward method for precisely preloading a bearing onto a shaft which provides digital readouts of the measured torque in standard in-lb. units.

Other objects and advantages of the present invention will become more apparent to those skilled in the art in view of the following description and the accompanying drawings.

SUMMARY OF THE INVENTION

Briefly, the present invention provides an apparatus and method for precisely preloading a bearing onto a shaft, in one aspect, a spherical bearing. The apparatus includes a base plate and a rotary die shaft support mounted to and extending upward from the base plate. The baseplate has a swivel plate attached rotatably to the upper surface of the base plate, and the supports are attached to the swivel plate. The swivel plate swivels up to 360° on the base plate and has a locking mechanism to retain the rotary die shaft in an axial relationship with a motor output shaft. The rotary die shaft has a shoulder, a tapered surface adjacent to the shoulder, and a threaded portion adjacent to the tapered surface. A shim is positioned on the shaft adjacent to the shoulder, and a bearing is positioned adjacent to the shim. The bearing has an inner race, an outer race, and a plurality of roller elements positioned between the inner race and outer race. The bearing is preloaded onto the shaft by a lock nut secured to the threaded portion of the shaft. The lock nut contacts the inner race of the bearing and forces the inner race to expand outwardly preloading the bearing onto the shaft. A motor mounted to the base plate provides the motor output shaft axially aligned with and connectable to the outer race of the bearing. The motor rotates the outer race of the bearing at a predetermined, constant speed. A force sensor attached to the motor measures the amount of torque required to rotate the outer race at the selected predetermined speed. The measured torque then is visually displayed on a display unit. The measured torque is controlled within a predetermined torque range to form the bearing precisely loaded.

The method of the present invention includes sliding a first shim onto the support shaft until it abuts the shoulder. The first shim has a predetermined thickness. A bearing then is slid onto the tapered surface, and a lock nut is tightened onto the threaded portion of the shaft. As the lock nut contacts the inner race of the bearing, the inner race expands, reducing the distance between the inner and outer races and preloading the elements of the bearing. The outer race of the bearing then is connected to a motor, and the motor is operated at a predetermined, constant speed. The torque required to rotate the outer race of the bearing is measured and compared to a predetermined torque range to provide a precisely preloaded bearing. In one aspect, the bearings are reconditioned bearings.

BRIEF DESCRIPTION OF THE DRAWINGS

FIG. 1 is a top view of an apparatus for precisely pre-loading a bearing onto a shaft.

FIG. 2 is a side view of the apparatus shown in FIG. 1 depicting the front panel of the display unit.

DETAILED DESCRIPTION

Figure 3:
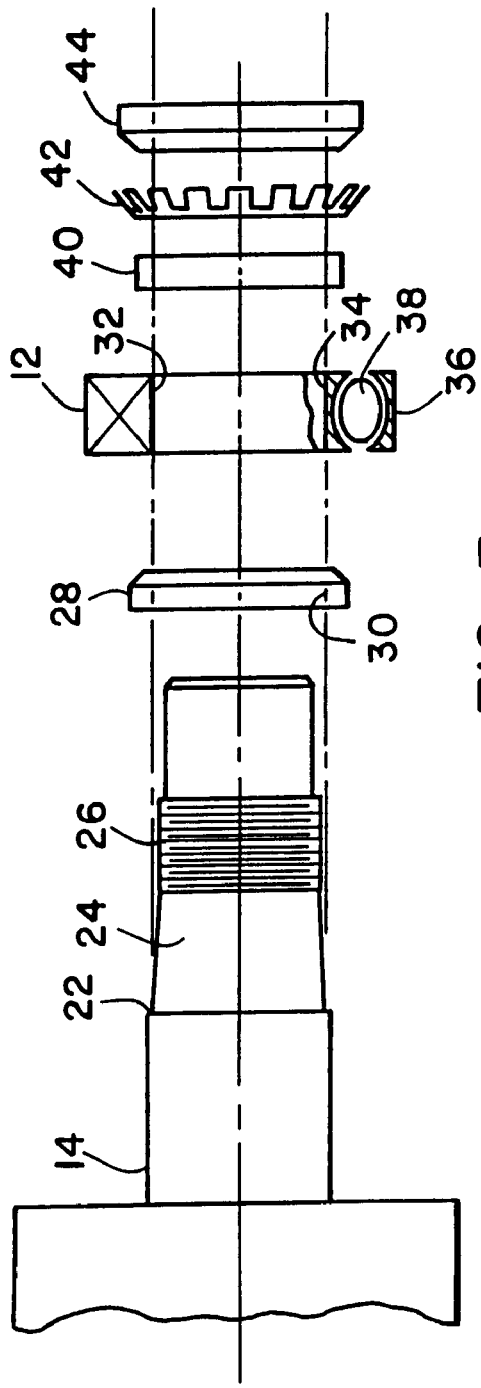
FIG. 3 is an exploded side view of a portion of a support shaft showing the arrangement of a shim, bearing, spacer, lock washer, and lock nut and including a partial cross-sectional view of one of the roller elements of the bearing.

The present invention provides a novel apparatus and method for the precision operation of a rotary die cutter. The novel rotary die cutter apparatus and method provide an important criticality of precision to avoid run-out in respect to a rotary die cutter and its operation under heavy rotary die cutter loads and with low tolerances in the contact between the rotary die cutter and the cutter's anvil, thereby providing less pressure and more structural integrity to produce longer knife life over faster article cut-out speeds.

The present invention provides an apparatus and method for precisely preloading a bearing onto a shaft. In one aspect, the present invention provides an apparatus and method for precisely preloading a spherical roller bearing onto a shaft.

The apparatus and method of the present invention include means for and method providing a base plate and a support mounted to the base plate, extending upward from the base plate. The support is capable of supporting a shaft having a shoulder, a tapered surface adjacent to the shoulder, and a threaded portion adjacent to the tapered surface. A shim is positioned on the shaft adjacent to the shoulder, and a bearing is positioned adjacent to the shim. The bearing has an inner race, an outer race, and a plurality of roller elements positioned between the inner race and outer race.

In accordance with the present invention, the bearing is preloaded onto the shaft by a lock nut secured to the threaded portion of the shaft. The lock nut contacts the inner race of the bearing and forces the inner race to expand outwardly. The expansion facilitates preloading the bearing onto the shaft.

The apparatus and method of the present invention further include a motor mounted to the base plate. The motor has an output shaft axially aligned with the outer race of the bearing and connectable to the outer race of the bearing.

In accordance with the present invention, the motor is capable of rotating the outer race of the bearing at a predetermined, constant speed. A force sensor is attached to the motor which is capable of measuring the amount of torque required to rotate the outer race at the selected predetermined speed. The measured torque then is visually displayed on a display unit. When the measured torque is within a predetermined torque range, the bearing will be determined to be precisely loaded.

In accordance with the present invention, the means and method are provided for sliding a first shim onto the support shaft until it abuts the shoulder. The first shim is provided with a predetermined thickness. A bearing then is slid onto the tapered surface, and a lock nut is tightened onto the threaded portion of the shaft. As the lock nut contacts the inner race of the bearing, it causes the inner race to expand. The expansion reduces the distance between the inner and outer races and preloads the roller elements of the bearing. The outer race of the bearing then is connected to a motor, and the motor is operated at a predetermined, constant speed. The torque required to rotate the outer race of the bearing is measured and compared to a predetermine torque range to determine the bearing is precisely preloaded.

In accordance with the present invention, the means and method are provided for a swivel plate to support the shaft and align it with a tube which connecting the outer race of the bearing with the motor, e.g., an air motor. After the first bearing has been tested, the swivel plate is unlocked, e.g., by lifting the locking plunger, and rotated 180 degrees to facilitate testing of the other bearing. Utilizing the swivel plate eliminates the need to remove the shaft after the first bearing is tested, and replace it for testing the other bearing. This makes the process quicker, more accurate, and safer, considering that the shaft is heavy.

In accordance with the present invention, the means and method are provided for the operation on reconditioned bearings more in detail. After a rotary die module is disassembled to resharpen the knife, the bearings are removed. The bearings are still usable, but the clearances have been changed because of wear on the rolling elements and the races. Rather than throw these good bearings away, since they are expensive, they are reused. However, since there has been some wear on the rolling elements and the races, the bearing shims must be changed to obtain the proper preload. Reusing the bearings by replacing the shims extends the useful life of the bearings by five (5) times or more. That is the purpose of the bearing tester, to realize this savings.

Referring now to FIGS. 1 and 2, an apparatus 10 is shown which is capable of precisely preloading a bearing 12, in one aspect a spherical roller bearing, onto a shaft 14. The apparatus 10 includes a base plate 16 and a support 18 mounted to the base plate 16. The support 18 extends upward from the base plate 16 and can be in the form of a single support member or a pair of support members as shown in the Figures. The support 18 is capable of supporting the shaft 14, preferably in a horizontal position, onto a device can be mounted. As shown, the shaft 14 has a rotary die cutter 20 mounted on the shaft 14. The rotary die cutter 20 is used to cut predetermined shaped products from an elongated ribbon of one or more layers of material. The shaft 14 also can support a devices including printing rolls used in the printing industry and various rolls for the paper industry.

The device mounted on the shaft 14 is centered on the shaft 14, and a bearing 12 is mounted on each side of the device. The pair of bearings 12 function to allow the assembly to be placed into a module of a machine such that the shaft 14 can be rotated on the bearings 12.

Figure 4:
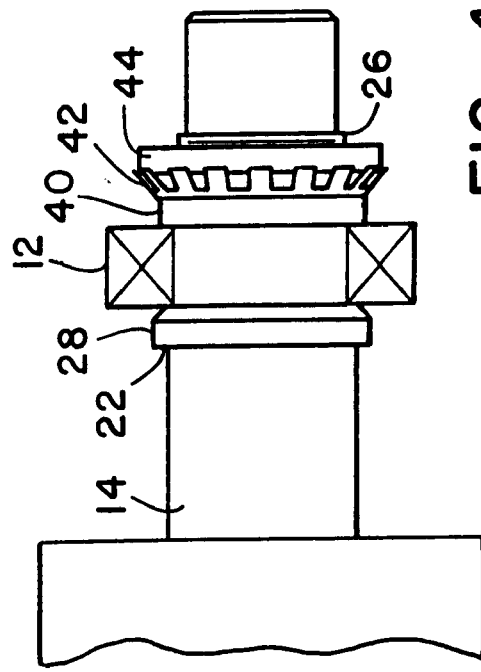
FIG. 4 is an assembled side view of the components shown in FIG. 3 depicting the bearing in a preloaded condition.

Referring now to FIGS. 3 and 4, one end of the shaft 14 is shown having a shoulder 22, a tapered surface 24 located adjacent to the shoulder 22, and a threaded portion 26 located adjacent to the tapered surface 24. For a pair of bearings 12 mounted on opposite ends of the shaft 14, each end of the shaft 14 contains a shoulder 22, a tapered surface 24, and a threaded portion 26. A first shim 28 is coaxially positioned onto the shaft 14. The first shim 28 is slid up to the shoulder 22. The first shim 28 preferably is formed of metal. The first shim 28 has an internal diameter 30 which is less than the outside diameter of the shoulder 22. The size difference prevents the first shim 28 from extending beyond the shoulder 22.

The first shim 28 has a predetermined thickness machined to a precise dimension. For example, the first shim 28 has a thickness measured in thousands of an inch or in ten thousands of an inch. The thickness of the first shim 28 is selected based on the bearing manufacturer's recommendation, taking into account the size and type of bearing 12 being used, the diameter of the shaft 14, and the taper formed into the tapered surface 24. The bearing 12, is a roller bearing having a tapered internal bore 32 machined to mate with the tapered surface 24 of the shaft 14 onto which bearing 12 is used. Preferably, the bearing 12 is a spherical roller bearing available from SKF Industries, Inc. having an office at 1100 First Avenue, King of Prussia, Pa. 19406.

The bearing 12 includes an inner race 34, an outer race 36 and, a plurality of roller elements 38 positioned between the inner and outer races, 34 and 36, respectively. One of the roller elements 38 of the bearing 12 is shown in FIG. 3 in a partially cut away view. The bearing 12 is sized to fit the shaft 14 onto which it is used. The bearing 12 used on a rotary die cutter 20 in the manufacturing process in accordance with the present invention preferably an SKF Industries, Inc. bearing, model number 26182, having a 50 mm internal diameter taper bore, a 90 mm outside diameter, and a width or thickness of 23 mm. Spherical roller bearings perform best in a rotary die cutter assembly. The bearings 12 used for a particular application vary in physical size and have different inside and/or outside diameters. A bearing width is varied between thin and thick. The taper formed on the internal bore of each bearing is machined to match the tapered surface 24 of the shaft 14 onto which the bearing 12 is positioned.

Each bearing 12 is nominally packed with an industrial grease to allow the roller elements 38 to rotate smoothly between the inner and outer races, 34 and 36, respectively. The grease used in the bearing 12 varies in viscosity and preferably is a synthetic grease, preferably containing an extreme pressure additive. One supplier of such bearing grease is Mobil Oil Corporation having an office at 3225 Gallops Road, Fairfax, Va. 22037. Premium greases such as Mobilith SHC 15, 46, and 100 are high-performance greases combining a synthetic base fluid with a lithium complex soap thickener. The synthetic base oil provides low temperature pumpability and very low start/run torque values, but are not extreme-pressure greases. The Mobilith SHC 100 is an NGLI Grade 2 grease formulated with an ISO 100 viscosity grade base oil and satisfies the long service life and performance requirements of grease lubricated rolling element bearings for most electric motor manufacturers.

Referring again to FIGS. 3 and 4, the bearing 12 is slid coaxially onto the shaft 14 so as to be positioned adjacent to the first shim 28. In this position, the bearing 12 may or may not be in physical contact with the first shim 28. After the bearing 12 is positioned on the shaft 14, a spacer 40 and a lock washer 42 are slid onto the shaft 14. A lock nut 44 then is screwed onto the threaded portion 26 of the shaft 14 and causes the spacer 40 to contact the inner race 34 of the bearing 12. As the lock nut 44 is tightened onto the threaded portion 26, the bearing 12 is forced up the tapered surface 24 and into physical contact with the first shim 28. The tightening action expands the inner race 34 of the bearing 12 outwardly, preloading the bearing 12 onto the shaft 14. As the inner race 34 expands outwardly, the "play" or distance between the individual roller elements 38 and the inner and outer races, 34 and 36 respectively, is reduced. The reduction of play or run out increases the precision of the bearing 12. It should be noted that a spacer 40 and a lock washer 42 are optional, when present the spacer 40 and the lock washer 42 assist the lock nut 44 in securing and retaining the bearing 12 in position. The preloaded bearing assembly is shown in FIG. 4.

It has been found to be advantageous to preload each bearing 12 onto the shaft 14 to a precise value. For new bearings, the preload value is set by the bearing manufacturer. For reconditioned bearings, the preload value is determined by judgment based on actual experience for similar shaft assemblies, i.e., rotary die cutter assemblies. By correctly setting each bearing to a recommended preload value, the shaft 14 will rotate with the necessary precision, and each bearing 12 is utilized to a maximum potential. If a bearing 12 is not precisely preloaded to a recommended value, it will be sloppy, and the rotary die cutter 38 supported on the shaft 14 will not nun with the required precision. Conversely, if the bearing 12 is excessively preloaded, it will fail prematurely and require expensive downtime and replacement. When a bearing 12 fails, the rotary die cutter 20 must be removed from the larger machine assembly and must be dismantled. The failed bearing 12 then must be replaced or be reconditioned. The rotary die cutter 20 then must be reassembled and integrated back into the larger machine assembly. These many operations require time, are very labor intensive, and are therefore expensive.

Referring again to FIGS. 1 and 2, the apparatus 10 further includes a motor 46 which is movably mounted, directly or indirectly, to the base plate 16 via a support 47. It has been found to be advantageous to secure the motor 46 and support 47 to the base plate 16 with an adjustment means for adjusting the motor 46 and support to be easily adjusted in at least two, and preferably in three directions (x, y, and z axes), relative to the shaft 14. In one aspect, the support 47 contains a plurality of slot means 48 for receiving bolts 50 to secure the motor 46 to the base plate 16. The slot means 48 enable the motor 46 and support 47 to be moved lengthwise on the base plate 16 and to be tightened in the preferred position. In another aspect, the support 47 is secured to the base plate 16 by other fastening mechanisms, including bolts and nuts, machine screws, keys and key ways, and mechanical stops and pins.

The motor 46 is capable of operating at a constant speed. The motor 46 can be an air or pneumatic motor, an electrical (alternating current or direct current) motor, a hydraulic motor, or any other kind of commercially available motor. The motor 46 has an output shaft 52 axially aligned with the shaft 14 and connectable to the outer race 36 of the bearing 12. The motor 46 is capable of rotating the outer race 36 of the bearing 12 at a predetermined, constant speed. One means of connecting the output shaft 52 to the outer race 36 of the bearing 12 is by a hollow drive tube 54. The drive tube 54 contains a circular plate 56 at one end which has an aperture 58 formed through the drive tube 54. The aperture 58 is shaped and sized to receive the output shaft 52 of the motor 46 securely. The opposite end of the drive tube 54 contains a set screw 60 adjustably positioned in an opening formed in the outer periphery of the drive tube 54. The drive tube 54 has an internal diameter sized to fit closely over the outer race 36 of the bearing 12. The set screw 60 then is tightened to secure the drive tube 54 to the outer race 36 of the bearing 12. The drive tube 54 provides a mechanical connection between the output shaft 52 of the motor 46 and the outer race 36 of the bearing 12. The mechanical connection assures a preferred rotation of the outer race 36 of the bearing 12 at the same speed as the output shaft 52 of the motor 46. By operating the motor 46, one can rotate the outer race 36 of the bearing 12.

In another aspect, other types and kinds of mechanical connections can be substituted for the drive tube 54. In one aspect, the motor 46 is moved axially closer to the bearing 12 and a bracket is used to join the output shaft 52 to the outer race 36 of the bearing 12.

The motor 46 is supported by a pair of ball bearings and is equipped with a torque arm means 62 for creating resistance preventing or limiting the rotation of the motor 46. The actual rotational speed of the motor 46 is governed by a speed potentiometer for an electric motor or by controlling air pressure used to drive an air motor. A potentiometer is an instrument for measuring an unknown voltage or potential difference by comparison to a standard voltage. A force sensor 64 is attached to the torque arm 62 and is capable of measuring the amount of torque required to rotate the outer race 36 of the bearing 12 for a given setting on the torque arm 62. The force sensor 64 can be a load cell, a strain gauge, or a variable resistor. A force sensor, such as a load cell, nominally includes an amplifier to enhance the output signal. Force sensors 64 are available from Magnetic Power Systems Inc. having an office located at 1628 Manufacturers Drive, Fenton, Mo. 63026. It has been found that Model CLI-5 load cell and model TR-3 tension amplifier work well in apparatus 10.

The force sensor 64 is electrically via a wire 66 to a display unit 68. The display unit 68 provides a visual readout of the measured torque. The display unit 68 contains a digital torque indicator 70 and/or an analog torque meter 72. The digital torque indicator 70 displays a numerical value for the torque sensed by the force sensor 64. The digital torque indicator 70 is a model IMD-100 meter available from Red Lion Controls having an office at 20 Willow Springs Circle, York, Pa. 17402. The analog torque meter 72 has a dial display and can provide a go/no go indication. The analog torque meter 72 is a model 16235 meter available from Simpson Electric Company having an office located at 853 Dundee Avenue, Elgin, Ill. 60120. When using the analog torque meter 72, the operator establishes a range of acceptable values, i.e., an upper and a lower value within which the measured torque values are acceptable.

The apparatus 10 further includes an rpm (revolutions per minute) sensor 74 mounted to record the revolutions of the drive tube 54. In FIG. 2, the rpm sensor 74 is shown attached to the motor support 47. An indicator of some kind, such as a mark, an indentation, or a protuberance is located on the drive tube 54 so as to enable the rpm sensor 74 to sense a complete revolution. The output from the rpm sensor 74 is conveyed electrically through a wire 76 to the display unit 68. The output from the rpm sensor 74 is displayed digitally on an rpm indicator 78. The rpm indicator 78 is a tachometer such as model 47100-400 available from Durant Instruments, Cutler-Hammer Inc. having an office at 4201 N. 27th Milwaukee, Wis. 53216. The rpm sensor 74 and rpm indicator 78 are optional, and if a motor is set to a constant speed, means for recording the rpm is not needed.

The rpm sensor 74 also can be mounted so as to record the revolutions of the output shaft 52, if preferred. It is preferred to position the rpm sensor 74 if the drive tube 54 is not used.

The power for operating the motor 46, for actuating the sensors 64 and 74, and for activating the indicators 70, 72, and 78 is supplied by a power supply unit 80. The power supply unit 80 has an on/off switch 82, as shown in FIG. 2. The motor 46 and the display unit 68 are connected electrically connected such that when the on/off switch 82 is actuated to the "on" position, all of the devices requiring power will become operational.

The apparatus 10 further includes a swivel plate 84 which swivels up to 360° on the base plate 16. The swivel plate 84 is attached rotatably to the upper surface of the base plate 16. The supports 18 are attached to the swivel plate 84. The swivel plate 84 has a locking mechanism 86 to retain the shaft 14 in an axial relationship with the output shaft 52 of the motor 46. The locking mechanism 86 includes a mechanical, electrical, hydraulic, or pneumatic mechanism. A simple locking mechanism uses at least one pull-type plunger 88 spring loaded into a down or lock position. The pull-type plunger 88 is a pin mechanism positioned to nest in an aperture 90 formed in the base plate 16. The locking mechanism 86 also requires that the swivel plate 84 is mounted to the base plate 16 by a pivot pin 92. By pulling up on the pull-type plunger 88, the swivel plate 84 becomes free to rotate on the pivot pin 92 relative to the base plate 16. When the bearing 12 on one side of a rotary die cutter 20 has been preloaded, the pull-type plunger 88 is pulled upward against the spring pressure, and the swivel plate 84 is rotated 180 degrees. The pull type plunger 88 then is inserted into a second hole 94 present in the base plate 16. Carefully machined holes 90 and 94 in the base plate 16 assure that after rotating the swivel plate 84 exactly 180°, the shaft 14 will be aligned axially with the output shaft 52 of the motor 46. This preferred alignment provides a second bearing to be preloaded onto the shaft 14 without requiring the operator to lift physically the rotary die cutter 20 off from the supports 18, rotate the rotary die cutter 20, and then reposition the die cutter onto the supports 18. The swivel plate 84 is particularly preferred when the rotary die cutter 20 is heavy. The swivel plate 84 increases the efficiency of the apparatus 10 when a pair of bearings 12 are positioned and preloaded onto opposite ends of a shaft.

Figure 5:
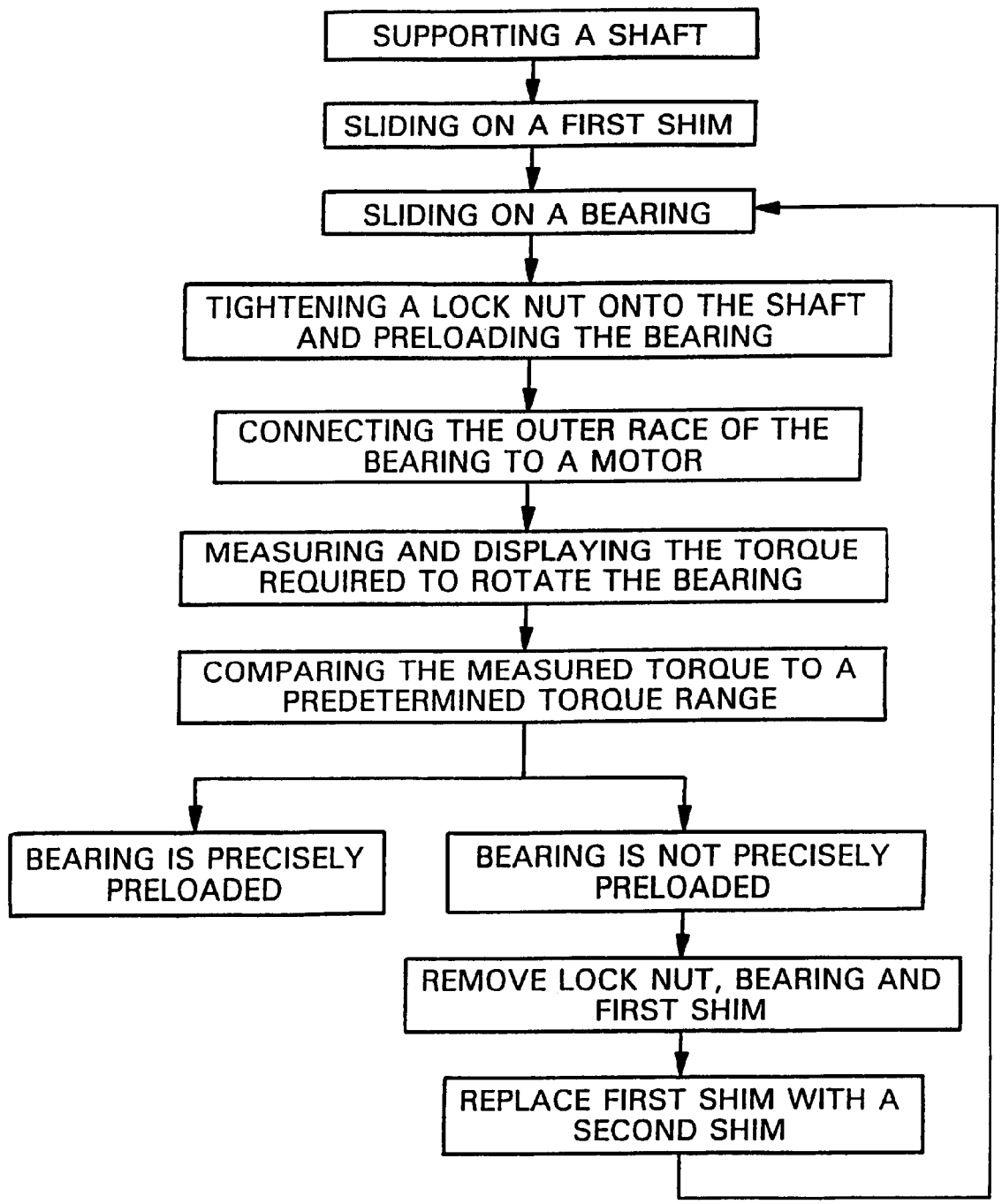
FIG. 5 is a flow diagram of the method for precisely preloading a bearing onto a shaft.

Referring now to FIG. 5, the method of the present invention for precisely preloading a bearing 12 onto a shaft 14 is depicted in the form of a flow diagram. The method of the present invention includes the steps of supporting the shaft 14, preferably in a horizontal position on a pair of supports 18. The shaft 14 has two distally spaced ends with an enlarged shoulder 22 formed adjacent to each end. The shaft 14 also has a tapered surface 24 located adjacent to each shoulder 22 and a threaded portion 26 located adjacent to each tapered surface 24. The method of the present invention will be described relative to one end of the shaft 14. A bearing 12 is preloaded onto each end of the shaft 14 in a similar manner as described for preloading on one end of the shaft 14.

A first item is slid onto the shaft 14 as a first shim 28. The first shim 28 has an internal diameter sized less than the outer diameter of the enlarged shoulder 22. The size difference provides for the first shim 28 to slide up to and abut the shoulder 22 but prevents the first shim 28 from sliding over the shoulder 22. The first shim 28 preferably is metal and has a finely calibrated predetermined thickness. The thickness of the first shim 28 is defined by the bearing manufacturer. A bearing 12, preferably a spherical roller bearing, then is slid onto the tapered surface 24. The bearing 12 has an inner race 34, an outer race 36, and a plurality of roller elements 38 positioned between the inner race 34 and outer race 36. The bearing 12 is packed with grease to facilitate roller movement and to reduce heat buildup. A spacer 40 and a lock washer 42 optionally then are slid onto the shaft 14. A lock nut 44 is tightened onto the threaded portion 26 of the shaft 14 and contacts the inner race 36 of the bearing 12 via the spacer 40 and the lock washer 42 when the spacer 40 and the lock washer 42 are present. As the lock nut 44 is tightened on the threaded portion 26, the bearing 12 moves upward along the tapered surface 24 and physically contacts the first shim 28. The inner race 36 of the bearing 12 is expanded radially, reducing the radial distance between the inner and outer races, 34 and 36, respectively. The expansion action exerts a force on the plurality of the roller elements 38 providing for preloading the bearing 12. The more the locking nut 44 is tightened, the higher the preload on the bearing 12.

When the bearing 12 has been preloaded onto the shaft 14 to an approximate predetermined value, the preload value is measured to determine final adjustment to preload precisely the bearing 12 to a predetermined value. The precise preload value is either a value set by the bearing manufacturer or a value determined by past experience with a particular rotary die cutter 20. The outer race 36 of the bearing 12 then is connected securely to a motor 46 capable of operating at a predetermined, constant speed. The connection preferably is by way of a hollow drive tube 54 or some similar kind of connector. The motor 46 is journaled by a pair of ball bearings and is equipped with a torque arm means 62 for creating resistance preventing or limiting the rotation of the motor 46. The actual rotational speed of the motor 46 is governed by a speed potentiometer for an electric motor or by controlling air pressure used to drive an air motor.

The rpm of the motor 46 is measured by an rpm sensor 74, and the measured rpm value is relayed electrically to an rpm indicator 78. The rpm indicator 78 forms part of the display unit 68 and provides a digital readout of the measured rpm value. The rpm indicator 78 is used when the motor 46 is capable of operating at more than one constant speed to advise the operator of motor speed for the motor 46.

A force sensor 64 is attached to the torque arm 62 of the motor 46 and measures the amount of torque required to rotate the outer race 36 of the bearing 12 for a given setting on the torque arm 62. When the motor 46 is started up initially, a warm up period is recommended to warm up the bearing grease. The warm up period for the bearing 12 should be less than about 10 minutes, preferably less than about 5 minutes and most preferably, about 3 minutes. The motor 46 can rotate the outer race 36 of the bearing 12 at various speeds but a speed of between 1-500 rpm, preferably less than about 250 rpm, and more preferably about 100 rpm is sufficient for most applications. With the motor 46 running, the torque required to rotate the outer race 36 of the bearing 12 is measured instantaneously and displayed using a force sensor 64 connected electrically to a display unit 68. The display unit 68 includes a digital torque indicator 70 and/or an analog torque meter 72. The digital torque indicator 70 displays the measured torque value in numerical form which is easy to read. The analog torque meter 72, on the other hand, uses a dial with a movable needle and is beneficial to use when a go/no go range of torque values has been determined. With the analog torque meter 72, an operator can see quickly if the measured torque value has actuated the needle such that it falls within the preselected range.

The measured torque value then is compared to a predetermined torque value or to a go/no go range of torque values. If the measured torque matches the predetermined torque value or if it is within the predetermined torque range, then the bearing 12 is preloaded precisely onto the shaft 14. If the measured torque does not match the predetermined torque value or if it is outside the predetermined torque range, then an adjustment must be made. If the amount of adjustment is small, it may be possible to adjust the preload on the bearing 12 by simply tightening or loosening the lock nut 44. By a "small amount" is meant a difference of less than about 0.75 in-lbs. However, if the measured torque value deviates from the predetermined torque value by more than a small amount, then it is necessary to remove the lock nut 44, the lock washer 42, the spacer 40, the bearing 12, and the first shim 28. The first shim 28 is replaced with a second shim having a thickness either less than or greater than the first shim 28.

The thickness of the second shim is selected based on the amount of difference the measured torque value is away from the predetermined torque value. When the measured torque value is less than the predetermined torque value, a second shim is selected which is thinner than the first shim 28. Conversely, when the measured torque value is greater than the predetermined torque value, a second shim is selected thicker than the first shim 28. The second shim is selected such that the shim thickness increases about 0.002 inches for every 1.5 in-lbs. the measured torque value exceeds the predetermined torque value. The thickness of the second shim should decrease about 0.002 inches for every 1.5 in-lbs. the measured torque value is below the predetermined torque value.

After a second shim has been selected having the correct thickness, it is positioned on the shaft 14 in a similar manner as was the first shim 28. The bearing 12, the spacer 40, the lock washer 42, and the lock nut 44 are reassembled onto the shaft 14. The lock nut 44 is tightened to bring the inner race 34 of the bearing 12 into physical contact with the second shim. The tightening action radially expands the inner race 34 of the bearing 12 and preloads the bearing 12 onto the shaft 14. The torque required to rotate the outer race 36 of the bearing 12 is measured with the force sensor 64 when the motor 46 is operating and the torque arm 62 is set. The measured torque value iteratively is measured and displayed instantaneously. The measured torque value is compared again to a predetermined torque value to determine if the bearing 12 is preloaded precisely. If the measured torque value matches the predetermined torque value, then the bearing 12 is preloaded precisely. If the measured torque value does not match the predetermined torque value, then the second shim is replaced by a third shim having a different thickness.

While the invention has been described in conjunction with a specific embodiment, it is to be understood that many alternatives, modifications, and variations will be apparent in the light of the foregoing description together with the accompanying figures of the drawings. Accordingly, the present invention is intended to embrace all such alternatives, modifications, and variations which fall within the scope of the appended claims.

What is claimed is:

1. An apparatus for precisely preloading a bearing onto a shaft, comprising:
   a) a baseplate;
   b) a support mounted to said base plate and extending upward from said base plate, said support capable of supporting a shaft having a shoulder, a tapered surface adjacent to said shoulder, and a threaded portion adjacent to said tapered surface, and a shim positioned on said shaft adjacent to said shoulder, a bearing positioned adjacent to said shim, said bearing having an inner race, an outer race, and a plurality of roller elements positioned between said inner race and outer race, and a lock nut secured to said threaded portion of said shaft which contacts and preloads said inner race of said bearing;
   c) a motor mounted to said base plate, said motor having an output shaft axially aligned with and connectable to said outer race of said bearing, said motor capable of rotating said outer race of said bearing at a predetermined speed;
   d) a force sensor attached to said motor capable of measuring the amount of torque required to rotate said outer race at a predetermined speed;
   e) display means for providing a visual readout of said measured torque; and
   f) a swivel plate attached rotatably to the upper surface of the base plate, wherein said supports are attached to said swivel plate.

2. The apparatus of claim 1, wherein said swivel plate swivels up to 360° on said base plate.

3. The apparatus of claim 1, wherein said swivel plate has a locking mechanism to retain said shaft in an axial relationship with said motor output shaft.

4. The apparatus of claim 3, wherein said locking mechanism comprises at least one pull-type plunger spring loaded into a down or lock position.

5. The apparatus of claim 4, wherein said locking mechanism is operated by a mechanical, electrical, hydraulic, or pneumatic means.

6. The apparatus of claim 4, wherein said locking mechanism comprises a pull-type plunger with a pivot pin mechanism positioned to nest in an aperture formed in said base plate.

7. The apparatus of claim 6, wherein said pull-type plunger is spring activated.

8. The apparatus of claim 6, wherein said motor is a constant speed air motor.

9. The apparatus of claim 8, wherein said force sensor is a load cell.

10. An apparatus for precisely preloading a bearing onto a shaft, comprising:
    a) a baseplate;
    b) a support mounted to said base plate and extending upward said base plate, said support capable of supporting a shaft;
    c) a shaft having a shoulder, a tapered surface adjacent to said shoulder, and a threaded portion adjacent to said tapered surface;
    d) a shim positioned on said shaft adjacent to said shoulder;
    e) a bearing positioned adjacent to said shim, said bearing having an inner race, an outer race and a plurality of roller elements positioned there between
    f) a lock nut secured to said threaded portion of said shaft which contacts and preloads said inner race of said bearing;
    g) a constant speed air motor mounted to said base plate, said motor having an output shaft axially aligned with and connectable to said outer race of said bearing, said motor capable of rotating said outer race of said bearing at a predetermined speed;
    h) a load cell force sensor attached to said motor capable of measuring the amount of torque required to rotate said outer race at a predetermined speed;
    i) display means for providing a visual readout of said measured torque;
    j) a swivel plate attached rotatably to the upper surface of the base plate, wherein said supports are attached to said swivel plate, wherein said swivel plate swivels up to 360° on said base plate; and
    k) a locking mechanism for retaining said shaft in an axial relationship with said motor output shaft, said locking mechanism comprising at least one pull-type plunger spring-loaded into a down or lock position and a pivot pin positioned to nest in an aperture formed in said base plate.

* * * * *